US011120521B2

(12) United States Patent
Goldman et al.

(10) Patent No.: US 11,120,521 B2
(45) Date of Patent: Sep. 14, 2021

(54) TECHNIQUES FOR GRAPHICS PROCESSING UNIT PROFILING USING BINARY INSTRUMENTATION

(71) Applicant: INTEL CORPORATION, Santa Clara, CA (US)

(72) Inventors: Orr Goldman, Kibbutz Harel (IL); Konstantin Levit-Gurevich, Kiryat Byalik (IL); Michael Berezalsky, Tirat Carmel (IL); Noam Itzhaki, Yokneam Elit (IL); Arik Narkis, Kiryat Tivon (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/235,257

(22) Filed: Dec. 28, 2018

(65) Prior Publication Data

US 2019/0213706 A1  Jul. 11, 2019

(51) Int. Cl.
| | |
|---|---|
| *G06T 1/20* | (2006.01) |
| *G06F 11/34* | (2006.01) |
| *G06F 9/50* | (2006.01) |
| *G06F 9/38* | (2018.01) |
| *G06F 9/455* | (2018.01) |

(52) U.S. Cl.
CPC ............. *G06T 1/20* (2013.01); *G06F 9/3877* (2013.01); *G06F 9/45525* (2013.01); *G06F 9/5055* (2013.01); *G06F 11/3409* (2013.01); *G06F 11/3466* (2013.01)

(58) Field of Classification Search
CPC ......... G06T 1/20; G06T 15/00; G06T 15/005; G06F 9/3877; G06F 9/45525; G06F 9/5055; G06F 11/3409; G06F 11/3466; G06F 9/30145
USPC ................................................. 345/501, 503
See application file for complete search history.

(56) References Cited

U.S. PATENT DOCUMENTS

| | | | | |
|---|---|---|---|---|
| 9,691,123 | B2 * | 6/2017 | Wang | G06F 11/3636 |
| 2008/0301650 | A1 * | 12/2008 | Talluri | G06F 11/3409 |
| | | | | 717/135 |
| 2010/0146220 | A1 * | 6/2010 | Panchenko | G06F 11/3471 |
| | | | | 711/154 |
| 2014/0298307 | A1 * | 10/2014 | Johnson | G06F 8/443 |
| | | | | 717/158 |
| 2015/0205586 | A1 * | 7/2015 | Diamos | G06F 8/41 |
| | | | | 717/158 |

(Continued)

*Primary Examiner* — Jacinta M Crawford
(74) *Attorney, Agent, or Firm* — Kacvinsky Daisak Bluni PLLC

(57) ABSTRACT

Techniques and apparatus for profiling graphics processing unit (GPU) processes using binary instrumentation are described. In one embodiment, for example, an apparatus may include at least one memory comprising instructions and a processor coupled to the at least one memory. The processor may execute the instructions to implement a profiling process to profile a graphics processing unit (GPU) application being executed via a GPU, the profiling process to perform an instrumentation phase to determine an operating process being executed via the GPU and to generate instrumented binary code for the operating process, perform an execution phase to collect profiling data for a command of the operating process, and perform a completion phase for a profiling application executed via the processor to read the profiling data. Other embodiments are described.

23 Claims, 8 Drawing Sheets

(56) References Cited

U.S. PATENT DOCUMENTS

| | | | |
|---|---|---|---|
| 2015/0248343 A1* | 9/2015 | Ionescu | G06F 8/70 717/130 |
| 2015/0378868 A1* | 12/2015 | Levit-Gurevich | G06F 11/3612 714/38.1 |
| 2018/0260197 A1* | 9/2018 | Tsingauz | G06F 8/447 |
| 2019/0034316 A1 | 1/2019 | Levit-Gurevich et al. | |
| 2019/0146766 A1* | 5/2019 | Sandanagobalane | G06F 8/451 717/157 |

* cited by examiner

TECHNIQUES FOR GRAPHICS PROCESSING UNIT PROFILING USING BINARY INSTRUMENTATION

TECHNICAL FIELD

Embodiments herein generally relate to computer processors, and more particularly, to processes for analyzing applications executed via graphics processing units (GPUs).

BACKGROUND

A graphics processing unit (GPU) provides a parallel hardware environment for implementing high-throughput and/or data-intensive applications, such as graphics processing applications. However, developing executable code that can efficiently and effectively take advantage of GPU technologies requires intensive analysis and tuning of application code. Developers may use a performance profiling tool to determine performance information for an executed application. The performance profiling tool may analyze the performance information to provide a performance evaluation that may be used by a developer to optimize the application.

DETAILED DESCRIPTION

Figure 1:
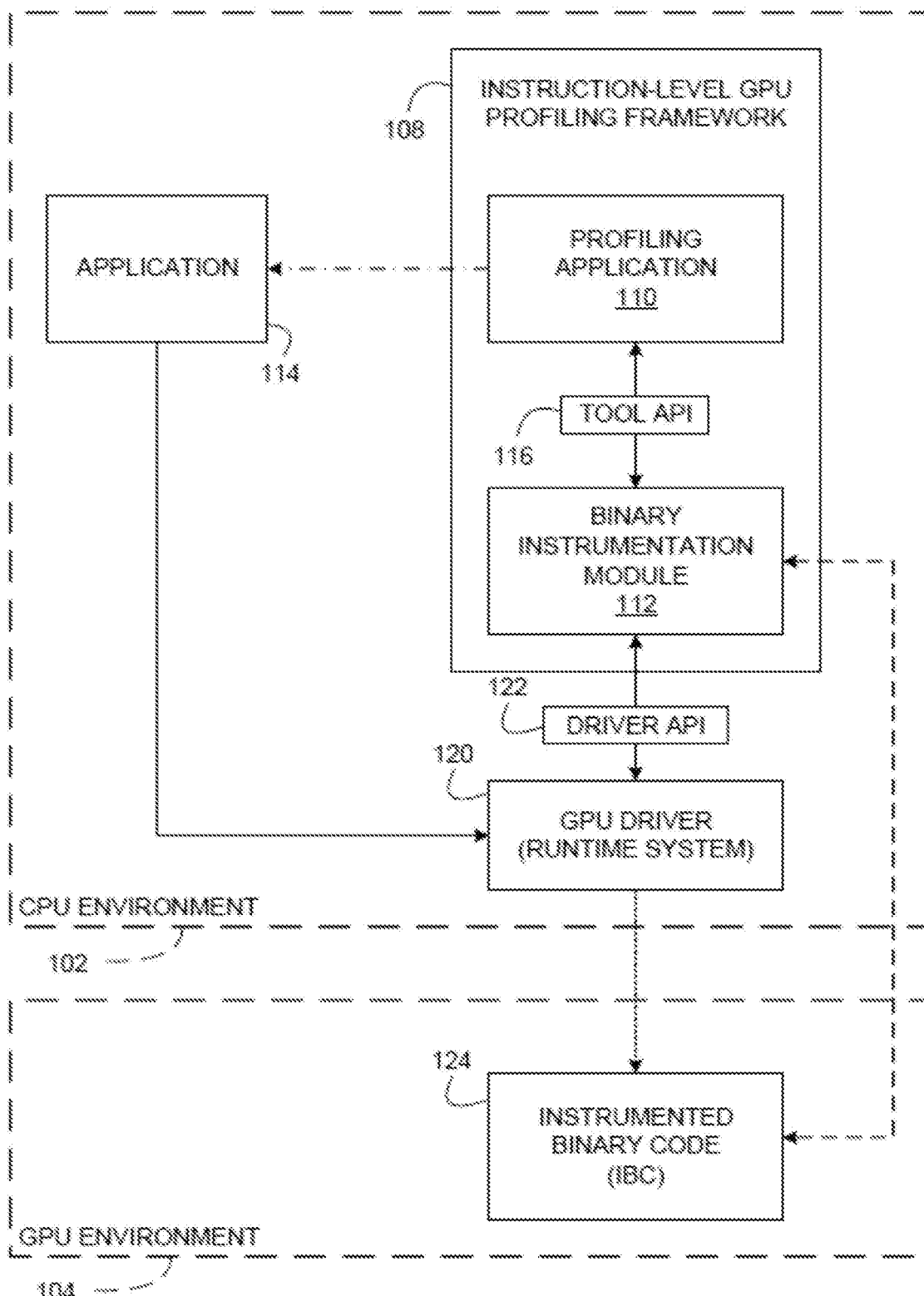
FIG. 1 illustrates an embodiment of a first operating environment.

Various embodiments may be generally directed to techniques to perform analysis processes on graphics processing units (GPUs) using binary instrumentation via a profiling protocol or process. In some embodiments, a binary instrumentation-based GPU profiling process may be provided to profile GPU applications. For example, exemplary embodiments may provide an application programming interface (API) to control profiling of a GPU kernel, such as a compute shader, shader application, and/or the like ("shader") at a low-level granularity. In various embodiments, the profiling process may include a protocol or process implemented between various profiling elements including, without limitation, an instrumentation engine, a driver, and/or a profiling application.

GPU applications have become more complex and computationally intensive. Accordingly, efficient and detailed GPU profiling applications have become a growing need for developers. Hardware architects have employed various profiling frameworks, such as GT-Pin for Intel® GPUs. In general, GT-Pin collects profiling data via dynamic binary instrumentation. For example, GT-Pin instrumentation may operate to inject instructions into the assembly code of binaries as it is compiled. As the program executes on the GPU, the insertions may output profiling results. Accordingly, GT-Pin, based on binary instrumentation, may allow for profiling GPU code running on execution units (EUs) at hardware thread granularity.

However, in other systems, the profiling application and the code to be profiled (for instance, a shader) run in different environments, namely, the CPU environment and the GPU environment, respectively. Accordingly, the profiling application is not able to control the execution of the profiled code. This prevents the developer from getting profile data in a fine-grain granularity. Non-limiting examples of fine-grain granularity may include, per shader/kernel, per draw/dispatch/enqueue, per execution unit (EU), per hardware thread, and/or the like. For example, GT-Pin based application maintain a "black box" mode that denies fine-grain granularity control from the user because, among other things, the profiled data is collected per kernel, shader, and/or the like over an entire workload. Other solutions, such as NVIDIA® GPU profiling tools (for instance, SASS instrumentor (SASSI)) are also based on "black box" compile-time profiling code generation that do not provide fine grain granularity profiling. More specifically, other GPU profiling solutions do not provide for efficient and effective profiling of individual kernels (for instance, shaders, draw granularity, submit granularity, and/or the like).

Accordingly, some embodiments may provide for profiling GPU operations at a fine grain granularity, such as at the kernel or shader level and/or the command level thereof. Various embodiments may provide profiling processes via, among other things, a profiling protocol between profiling components such as an instrumentation engine, a driver, a profiling application or tool, and/or the like. In exemplary embodiments, the profiling protocol may facilitate collecting profiling data in at a per-kernel, per-shader, per-draw, per-hardware thread, per-submit, and/or the like granularity.

Other binary instrumentation technologies that may be used to profile a GPU program are based on hardware performance counters in GPUs in combination with driver/runtime utility Application Programming Interfaces (APIs). In such techniques, the driver/runtime utility APIs define function calls that enable developer-access to such hardware performance counters. An example of such a GPU-based profiler is the Intel® Graphics Performance Analyzer (GPA). To use such binary instrumentation technologies to profile a GPU program, developers must modify their GPU source code to include the function calls from the driver/runtime utility APIs. For example, to measure the execution performance of a particular API-level graphics operation, the developer must add API-based function calls from a driver/runtime utility API at points in the source code suitable for measuring the performance of the graphics operation of interest. However, such GPU program profiling techniques based on hardware performance counters and corresponding API calls may result in coarse granularity of collected profiling data and may require modifying the source code based on API calls. That is, because the resulting profiling information is based on API-level calls and hardware performance counters, the resulting performance data is limited to the granularity of the entire kernel or the GPU program (e.g., a shader GPU program). For example, API-based profiling instructions used to access the hardware performance counters cannot be used to monitor execution performance at a lower level of granularity than high-level API calls that form the GPU program source code. Using such techniques, deeper, more granular insights at the per source code instruction level and/or into the machine instruction-level of the binary code cannot be captured. For example, performance insights (e.g., instruction latencies, control flow executions, instruction frequencies, hotspot detections, etc.) down to executions of specific machine instructions and/or basic blocks of machine instructions cannot be determined using such high-level API-based calls. Therefore, such techniques cannot be used to determine different machine instruction-level portions of graphics processes that contribute to high clock-cycle usage (e.g., code that runs "hot") and/or low clock-cycle usage (e.g., code that runs "cold"). Such techniques also cannot be used to determine the number of times different individual machine instructions and/or basic blocks of machine instructions have been executed.

Profiling processes according to some embodiments may facilitate the identification of GPU application issues, such as bottlenecks and hotspots in graphics applications (e.g., a DirectX API, an OpenGL API, a Metal API, etc.) and general purpose (GP) GPU compute applications (e.g., an OpenCL API, a CM API, etc.) and other low-level performance insights at machine-level instruction granularity which is a finer granularity than API-level profiling. Profiling processes according to some embodiments may facilitate dynamic profiling of compiled binary code to be executed on the GPU EUs via user-specified profiling configurations (e.g., in the form of instrumentation schemas).

Profiling processes according to various embodiments may facilitate performance analysis of graphics applications or GPGPU applications, and, for example, analysis of the dynamic behavior of the code running on GPU EUs with finer granularity insights far beyond the coarser granularity performance measures achievable using hardware performance counters and/or other techniques. Profiling processes, GPUs, and/or the like configured according to some embodiments may be advantageously employed by hardware architects inside GPU design and manufacturing environments, application developers, and/or other GPU stakeholders. For example, hardware architects may implement some embodiments for use in driver/compiler development and optimization (e.g., when developing GPU hardware and/or corresponding firmware and/or drivers), and application developers may employ some embodiments to develop efficient graphics applications and/or GPGPU applications.

FIG. 1 illustrates an embodiment of a first operating environment. As shown in FIG. 1 an operating environment (computing platform or apparatus) 100 may include an example instruction-level GPU profiling framework 108 (e.g., GPU profiling framework) to perform machine instruction-level GPU profiling and/or source code instruction-level GPU profiling based on, for instance, inserting profiling instructions in target object code (e.g., object code to be measured or profiled for performance) using binary instrumentation. The computing platform 100 may include an CPU environment 102 and an GPU environment 104. In some embodiments, the processing units of the CPU environment 102 and/or the GPU environment 104 may be or may include processing circuitry. In various embodiments, the CPU environment 102, the GPU environment 104, and/or elements thereof may be implemented in software, hardware, and/or a combination thereof. In the CPU environment 102, firmware and/or software programs may be executed by a CPU (e.g., an Intel® x86 compatible processor and/or any other processor). In the GPU environment 104, firmware and/or software programs may be executed by a GPU (e.g., an Intel® HD graphics processor, an Intel® Iris graphics processor, and/or the like). The GPU profiling framework 108 may include an example profiling application 110 and a binary instrumentation module 112.

In some embodiments, the GPU profiling framework 108 may be used to profile the GPU performance of one or more graphics processes (e.g., a graphics rendering operation, a graphics shader operation, a graphics compute kernel operation, etc.) of an application 114 that employs one or more graphics APIs (e.g., a DirectX API, an OpenCL API, a Metal Compute API, a Metal Graphics API, an OpenGL API, etc.). The application 114 of the illustrated example may be coded in a high-level language (e.g., the C programming language, the C++ programming language, DirectX, OpenCL, Metal Compute, Metal Graphics, OpenGL, and/or the like) as a native application developed to run on the computing platform 100. Being a native application, the application 114 is designed to use features of an operating system and/or graphics software/libraries (e.g., the DirectX API, the OpenCL API, the Metal Compute API, the Metal Graphics API, the OpenGL API, and/or the like) installed on the computing platform 100.

In various embodiments, the GPU profiling framework 108 may be used to instrument object code that was compiled based on source code of the one or more graphics processes of the application 114, for instance, to measure machine instruction-level performance of those graphics process(es) of the application 114. Such performance may be representative of various performance metrics including, without limitation, the number of GPU clock cycles or the duration required to execute one or more machine instruction-level operations (e.g., one or more move instructions, one or more add instructions, one or more multiply instructions, one or more shift instructions, etc. and/or combinations thereof) of a compute operation. Non-limiting examples of a compute operation may include a graphics rendering operation, a graphics shader operation, a graphics compute kernel operation, and/or the like of the application 114. In exemplary embodiments, the application 114 need not be aware of the GPU profiling framework 108 and/or the binary instrumentation performed by the GPU profiling framework 108. As such, the application 114 executes in a normal execution mode without being aware of any underlying binary instrumentation being performed to measure its GPU-based performance. In some examples, the application 114 may also include CPU-based programming code that is targeted to run on a CPU in addition to GPU-based programming code that implements the one or more graphics processes for which GPU performance profiling is to be performed by the GPU profiling framework 108.

The profiling application 110 may provide a user interface (e.g., a GUI and/or a command line interface) to allow developers to specify performance measures that are to be collected based on binary instrumentation of target object code, and to display collected profiling data (e.g., performance measures) about the target object code for the developers. Unlike API-level performance profiling of Intel® VTune™ Amplifier Performance Profiler and/or the Intel® Graphics Performance Analyzer, the profiling application 110 may enable users to specify performance parameters that are to be monitored at the instruction level (e.g., a source code instruction level and/or a machine instruction level). The binary instrumentation module 112 may be implemented using a binary instrumentation tool (e.g., the Intel® GT-PIN binary instrumentation tool for Intel® GPUs) that has been adapted to insert machine instructions into complied GPU object code in accordance with various embodiments.

The profiling application 110 and the binary instrumentation module 112 may communicate via a tool API 116. The example tool API 116 may facilitate the profiling application 110 to provide user-specified performance profiling parameters to the binary instrumentation module 112 via high-level programming language statements (e.g., the C programming language, the C++ programming language, and/or the like) or in any other suitable form (e.g., plain text, tabular form, extensible markup language (XML), and/or the like). For example, a user may analyze the application 114 to identify aspects of the application 114 to acquire performance profiling data. In the illustrated example, the user-specified performance profiling parameters provided by users via the profiling application 110 may be used by the profiling application 110 to configure and control the binary instrumentation module 112 by instructing it on the types of machine instruction-level instrumentations to be used and locations in the target object code at which the instrumentations should be made. In some embodiments, the profiling application 110 may analyze the application 114 automatically without manual user analysis of the application 114. In such embodiments, the profiling application 110 may operate in an automated manner to review programming statements, function calls, sub-routines, and/or the like in the application 114 to identify aspects of the code that should be profiled for performance analysis.

The binary instrumentation module 112 may be in communication with a GPU driver 120 via a driver API 122. The example GPU driver 120 may provide the binary instrumentation module 112 with compiled binary object code corresponding to the application 114. In this manner, the binary instrumentation module 112 may instrument the binary object code with profiling instructions at the machine instruction level. Although the GPU driver 120 is shown in the embodiment of FIG. 1, in various other embodiments, a runtime system API may be used instead of the GPU driver 120 to communicate with the binary instrumentation module 112.

In various embodiments, resulting example instrumented binary code 124 may be generated by the binary instrumentation module 112 and provided to a GPU hardware device (e.g., the GPU hardware device 204 of FIG. 2) instead of the original binary code of the application 114 so that EUs of the GPU hardware device can execute the instrumented binary code 124 in the GPU environment 104 instead of the original binary code. In exemplary embodiments, the instrumented binary code 124 may include one or more instrumented renderers, one or more instrumented shaders, one or more instrumented compute kernels, and/or any other types of instrumented graphics operations or sub-routines. While executed on GPU EUs, profiling data generated based on instrumented profiling instructions inserted by the binary instrumentation module 112 in the instrumented binary code 124 may be collected. In some embodiments, the binary instrumentation module 112 may be configured to have interactive communication with GPU environment 104 in which the instrumented binary code 124 is executed so that the binary instrumentation module 112 can dynamically retrieve the generated profiling data in real time during execution of the instrumented binary code 124. The binary instrumentation module 112 may provide the generated profiling data to the profiling application 110 for further processing and analysis. The processed results may then be presented to the user via a graphical user interface. In the illustrated example, since the binary instrumentation module 112 inserts profiling instructions in the instrumented binary code 124 at the machine instruction level, the resulting profiling data is generated at the granularity of individual EUs and corresponding hardware threads.

In some embodiments, the GPU profiling framework 108, the GPU driver 120, the driver API 122, and the instrumented binary code 124 may run on the same processor system. In other embodiments, the GPU profiling framework 108 may run on a separate processor system than the GPU driver 120, the driver API 122, and the instrumented binary code 124.

Figure 2:
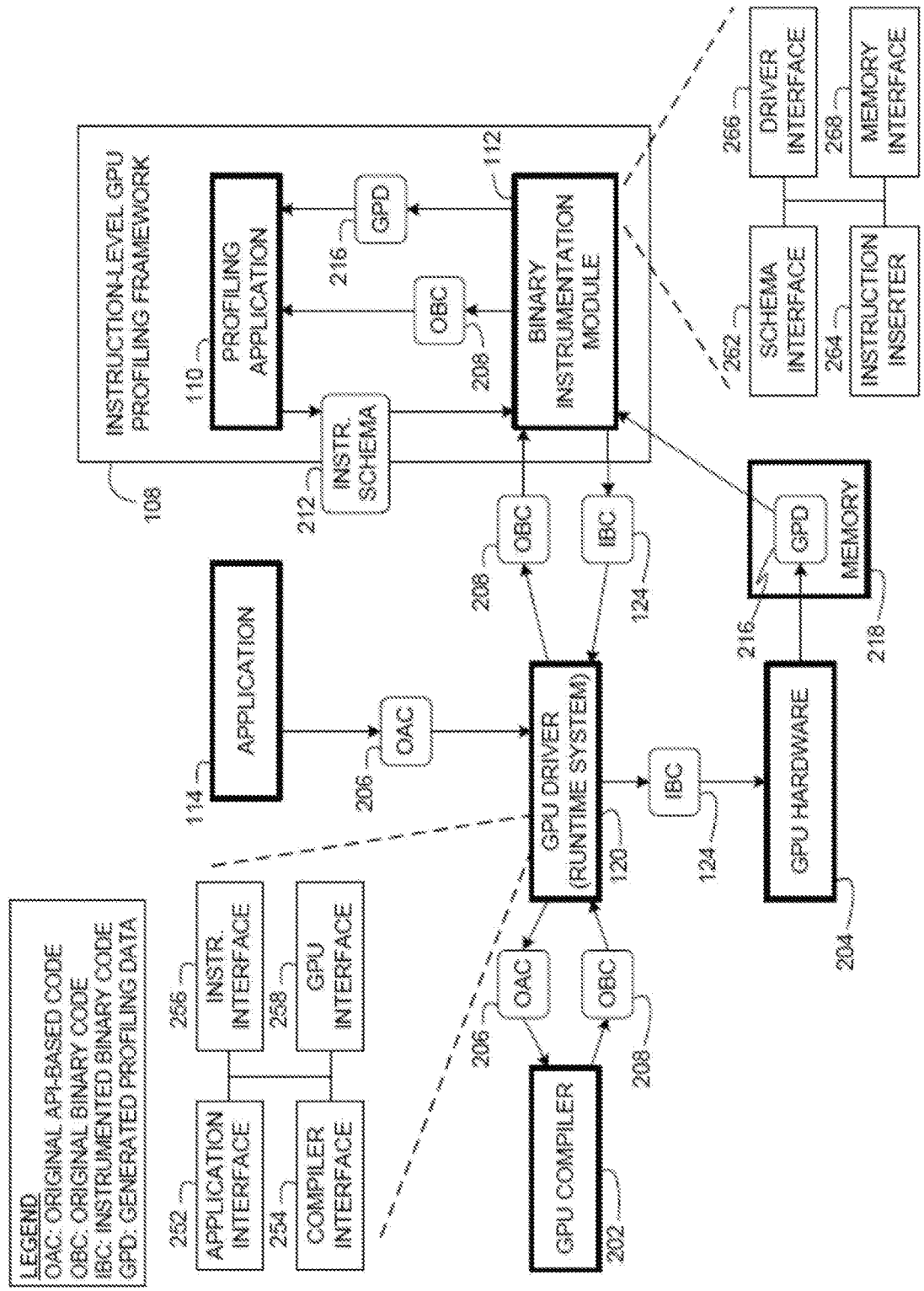
FIG. 2 illustrates an embodiment of a second operating environment.

FIG. 2 illustrates an embodiment of a second operating environment. As shown in FIG. 2, operating environment 200 (computing platform or apparatus) may include the GPU driver 120 of FIG. 1 in communication with the example instruction-level GPU profiling framework 108 of FIG. 1 to perform instruction-level GPU profiling based on binary instrumentation. In the illustrated example, the GPU driver 120 is in communication with the application 114, the binary instrumentation module 112, a GPU compiler 202, and a GPU hardware device 204. The application 114 may include an original non-instrumented application that includes original API-based code (OAC) 206 (e.g., for implementing various compute operations, a graphics renderer, a graphics shader, a graphics compute kernel, and/or the like). The application 114 may communicate with the corresponding GPU driver 120 (or a runtime system API) as defined by the specific graphics API interface(s) (e.g., a DirectX API, an OpenCL API, a Metal Compute API, a Metal Graphics API, an OpenGL API, etc.) used to develop the application 114. The example GPU driver 120 may receive the OAC 206 (e.g., in the form of a file) and provides it to the GPU compiler 202. For example, the OAC 206 may include a flag or value in a header (e.g., a file header) from which the GPU driver 120 can determine that it is non-instrumented source code needing to be compiled.

The example GPU compiler 202 may include a graphics processor compiler that compiles source code such as the OAC 206 to object code based on a target instruction set architecture (ISA) for execution by a target GPU device such as the GPU hardware device 204. In some examples, the example GPU compiler 202 may be implemented as a just-in-time (JIT) compiler that compiles source code (e.g., the OAC 206) during runtime in just-in-time fashion before execution by, for example, the GPU hardware device 204. In the illustrated example of FIG. 2, the GPU compiler 202 receives and compiles the OAC 206 to generate example original binary code (OBC) 208 (e.g., in the form of a file). In the illustrated example, the GPU compiler 202 may be separate from the binary instrumentation module 112. As such, the GPU compiler 202 of the illustrated example does not instrument the OBC 208 with profiling instructions. However, in other examples, the binary instrumentation module 112 may be implemented as part of the GPU compiler 202. After the OAC 206 is compiled, the resulting OBC 208 may be in form for execution by the GPU hardware device 204. In various embodiments, the GPU hardware device 204 may be implemented using an Intel® HD graphics processor, an Intel® Iris graphics processor, and/or any other GPU.

Since the example application 114 is not provided with instrumentation/profiling instructions, the OAC 206 and the OBC 208 resulting from the application 114 of the illustrated example may be referred to as original code because they are not instrumented with profiling instructions that could be used to measure execution performance when the OBC 208 is executed by the GPU hardware device 204. That is, the example application 114 may include software or firmware source code implemented using programming statements, function calls, subroutines, etc. in a high-level language in the original non-instrumented form such as the precompiled OAC 206. However, compilation of the OAC 206 by the GPU complier 202 may generate a binary machine instruction-level representation of the application 114 in the form of the OBC 208 that causes the GPU hardware device 202 to execute the programming statements, function calls, subroutines, etc. programmed in the application 114.

In various embodiments, instead of providing the OBC 208 to the GPU hardware device 204 for execution, the GPU driver 120 may be configured to reroute the OBC 208 to the binary instrumentation module 112 so that the binary instrumentation module 112 can instrument the OBC 208 for performance profiling by inserting machine instruction-level profiling instructions into the OBC 208 to generate the example IBC 124. For example, the GPU driver 120 may read a flag or value in header information (e.g., a file header) of the OBC 208 indicating that the OBC 208 is non-instrumented object code. Based on the header information, the GPU driver 120 may determine that it should provide the OBC 208 to the binary instrumentation module 112 so that the binary instrumentation module 112 can instrument it with profiling instructions.

In some embodiments, the binary instrumentation process of the binary instrumentation module 112 may be driven by the profiling application 110, which receives the OBC 208 from the binary instrumentation module 112 and generates an example instrumentation schema 212 to specify how to instrument the OBC 208 with profiling instructions. The example profiling application 110 communicates with the binary instrumentation module 112 via the instrumentation schema 212 to control how the binary instrumentation module 112 performs desired instrumentation of specified profiling instructions on the OBC 208. The example instrumentation schema 212 includes performance profiling parameters in high-level programing language statements (e.g., the C programming language, the C++ programming language, etc.) or in any other suitable form (e.g., plain text, tabular form, extensible markup language (XML), etc.). For example, a high-level API-based user-specified performance profiling parameter in the instrumentation schema 212 may instruct the binary instrumentation module 112 to insert profiling instructions at particular locations of target object code that measure different aspects of high-level graphics operations (e.g., different aspects of a graphics renderer, different aspects of a graphics shader, different aspects of a graphics compute kernel, etc.). The different aspects may include the performance of one or more move instructions, one or more add instructions, one or more multiply instructions, one or more shift instructions, etc. and/or any combination of machine instruction-level instructions that make up different portions of high-level graphics operations.

Example profiling instruction insertion statements generated by the profiling application 110 in the instrumentation schema 212 may specify specific profiling instructions to insert at different code locations in target code (e.g., the OBC 208) and/or may specify performance parameters to measure for different specified code sequences in target code. For example, instruction insertion statements may specify to add a time-stamp start read (or counter start read) profiling instruction at an instruction insertion point before machine instruction A and add a time-stamp end read (or counter end read) profiling instruction at an instruction insertion point after machine instruction B. In such example, machine instructions A and B may refer to specific instructions in the OBC 208 that were identified by the profiling application 110 as inclusively bounding (e.g., start and end points) a code sequence to be profiled that includes the machine instructions A and B. In this manner, the resulting instrumentation of the OBC 208 with the time-stamp start/stop read (or counter start/stop read) profiling instructions added at corresponding instruction insertion points can be used to measure an execution duration (e.g., in a time unit of measure or in GPU clock cycles) of the bounded code sequence inclusive of the machine instructions A and B. Alternatively, an instruction insertion statement may specify to measure a particular performance parameter (e.g., an execution duration) for a code sequence bound by machine instructions A and B in the OBC 208. In such examples, the binary instrumentation module 112 may be provided with a profiling instruction look-up table or other type of instruction-reference guide that specifies what types of instructions to use for what types of performance parameters specified in the instrumentation schema 212 to be measured. For example, the profiling instruction look-up table or other type of profiling instruction-reference guide may indicate that an execution duration is measured by adding a time-stamp start read (or counter start read) profiling instruction at an instruction insertion point before a starting code sequence instruction (e.g., the machine instruction A) and add a time-stamp end read (or counter end read) profiling instruction at an instruction insertion point after an ending code sequence instruction (e.g., the machine instruction B).

During the binary instrumentation process, the binary instrumentation module 112 may obtain the performance profiling parameter settings or configurations from the instrumentation schema 212 to identify the types of profiling instructions to insert in the OBC 208 and locations in the OBC 208 at which to insert the profiling instructions to generate example instrumented binary code (IBC) 124. The example binary instrumentation module 112 may provide the IBC 124 to the GPU driver 120, and the GPU driver 120, in turn, routes the IBC 124 to the GPU hardware device 204 for execution by GPU hardware device 204. For example, the GPU driver 120 may read a flag or value in header information of the IBC 124 indicating that the IBC 124 is instrumented binary code. The GPU driver 120 may determine, based on the header information, to route the IBC 124 to the GPU hardware device 204 for execution.

Since the IBC 124 of the illustrated example includes the original code of the OBC 208 and the instrumented profiling instructions inserted by the binary instrumentation module 112, when the GPU hardware device 204 executes the IBC 124, the IBC 124 causes the GPU hardware device 204 to perform the graphics operations programmed in the OBC 208 and also causes the GPU hardware device 204 to generate and collect profiling data based on the instrumented profiling instructions. In the illustrated example of FIG. 2, the collected profiling data is shown as generated profiling data (GPD) 216. Since the instrumented profiling instructions are inserted at the machine instruction level, the IBC 124 causes the GPU hardware device 204 to generate the GPD 216 with fine granularity at the EU level and hardware thread level of the GPU hardware device 204. Based on the instrumented profiling instructions in the IBC 124, the GPU hardware device 204 stores the GPD 216 at one or more locations in memory 218 specified by the instrumented profiling instructions. For example, the instrumented profiling instructions may cause the GPU hardware device 204 to allocate memory space in the memory 218 at which to store the GPD 216. Because the binary instrumentation module 112 provided those instrumented profiling instructions, the binary instrumentation module 112 is aware of the memory spaces allocated in the memory 218 at which the GPU hardware device 204 stores the GPD 216. In this manner, the binary instrumentation module 112 can subsequently retrieve the GPD 216 from those allocated memory spaces in the memory 218.

During execution of the IBC 124 or after completion of execution of the IBC 124 (e.g., during or after execution of a portion of the application 114, during or after a draw command, after completing processing of a command buffer, etc.), the profiling application 110 may operate with the binary instrumentation module 112 to retrieve and access the GPD 216 from the memory 218. In the illustrated embodiment, the profiling application 110 may display performance measures based on the GPD 216 via a user interface. In some embodiments, the profiling application 110 may apply one or more different types of analyses to the GPD 216 and display results of such analyses via a user interface. For example, some analyses may provide performance statistics analysis such as informing a user of the best performing machine instruction routines in the object code relative to other machine instruction routines in the same object code. Other analyses may inform a user of possible improvements to the code such as loop unrolling, memory use optimization, etc.

In some embodiments, the GPU driver 120 may be provided with or otherwise associated with an application interface 252, a compiler interface 254, an instrumentation interface 256, and/or a GPU interface 258 to enable the GPU driver 120 to receive, arbitrate, and send ones of the OAC 206, OBC 208, and IBC 124 from and/or to ones of the example application 114, the example GPU compiler 202, the example GPU hardware device 204, and the example binary instrumentation module 112. The GPU driver 120 may be provided with the application interface 252 to receive the OAC 206 from the application 114. The GPU driver 120 may be provided with the compiler interface 254 to provide the OAC 206 to the GPU compiler 202 and to receive the OBC 208 from the GPU compiler 202. The GPU driver 120 may be provided with the instrumentation interface 256 to provide the OBC 208 to the binary instrumentation module 112 and to receive the IBC 124 from the binary instrumentation module 112. The GPU driver 120 may be provided with the GPU interface 258 to provide the IBC 124 to the GPU hardware device 204.

In various embodiments, the binary instrumentation module 112 may be provided with an example schema interface 262, an example instruction inserter 264, an example driver interface 266, and an example memory interface 268. The binary instrumentation module 112 may be provided with the schema interface 262 to receive the instrumentation schema 212 from the profiling application 110. The binary instrumentation module 112 may be provided with the instruction inserter 264 to insert profiling in the OBC 208 to generate the IBC 124. The binary instrumentation module 112 may be provided with the driver interface 266 to receive the OBC 208 from the GPU driver 120 and to provide the IBC 124 to the GPU driver 120. The binary instrumentation module 112 may be provided with the memory interface 268 to access the GPD 216 in the memory 218 and to provide the GPD 216 to the profiling application 110.

While an illustrative embodiment of implementing the instruction-level GPU profiling framework 108 and the GPU driver 120 is illustrated in FIGS. 1 and 2, one or more of the elements, processes and/or devices illustrated in FIGS. 1 and 2 may be combined, divided, re-arranged, omitted, eliminated and/or implemented in any other way. Further, the instruction-level GPU profiling framework 108, the profiling application 110, the binary instrumentation module 112, the GPU driver 120, the application 114, the GPU compiler 202, the GPU hardware 204, the memory 218, the application interface 252, the compiler interface 254, the instrumentation interface 256, the GPU interface 258, the schema interface 262, the instruction inserter 264, the driver interface 266, and/or the memory interface 268 of FIG. 1 and/or FIG. 2 may be implemented by hardware, software, firmware and/or any combination of hardware, software and/or firmware. Thus, for example, any of the instruction-level GPU profiling framework 108, the profiling application 110, the binary instrumentation module 112, the GPU driver 120, the eample application 114, the GPU compiler 202, the GPU hardware 204, the memory 218, the application interface 252, the compiler interface 254, the instrumentation interface 256, the GPU interface 258, the schema interface 262, the instruction inserter 264, the driver interface 266, and/or the memory interface 268 may be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)).

Figure 3:
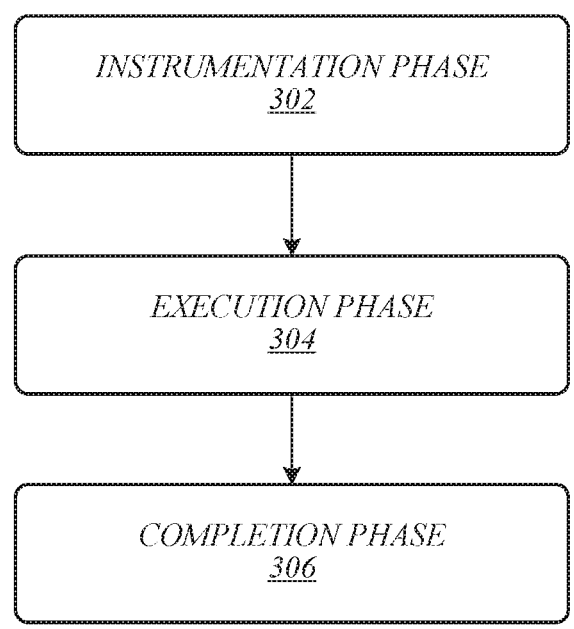
FIG. 3 illustrates an embodiment of a first logic flow.

FIG. 3 illustrates an embodiment of a logic flow 300. The logic flow 300 may be representative of some or all of the operations executed by one or more embodiments described herein, such as operating environment 100, operating environment 200, and/or components thereof. In some embodiments, the logic flow 300 may be representative of some or all of the operations of executing a compute process. In some embodiments, a compute process may include, without limitation, a kernel and/or a shader.

The logic flow 300 may execute an instrumentation phase at block 302. For example, the application runtime of the compute process (for example, DirectX, OpenCL, Metal, and/or the like) may use a driver (for instance, that includes a compiler) to compile high-level code to the binary associated with execution of the compute process (such code, since it is not instrumented, may be referred to as "native binary" and/or "original binary") (see, for instance, FIG. 4).

At block 304, the logic flow 300 may enter an execution phase. For example, the application runtime may communicate to the driver to run a kernel with given parameters (for instance, "draw" in DX, "enqueue" in OpenCL, and/or the like) (see, for instance, FIG. 5). The execution phase may occur immediately or substantially immediately prior to the native binary executing on the GPU.

The logic flow 300 may execute a completion phase at block 306. For example, the completion phase may include the GPU communicating to the driver that the GPU has finished processing a certain operation (for instance, draw, dispatch, and/or the like) and that the driver should alert the application runtime (see, for instance, FIG. 6).

Figure 4:
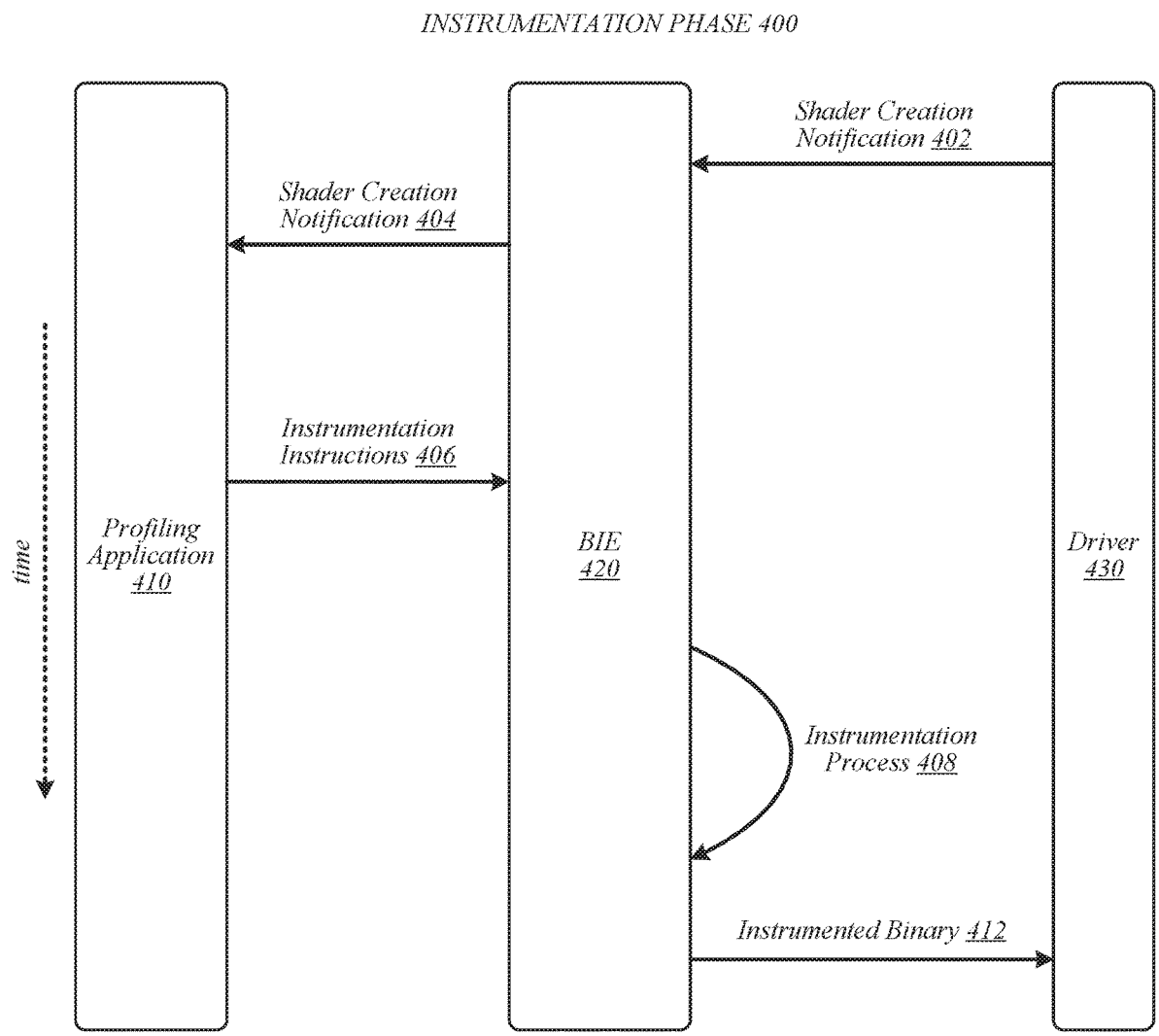
FIG. 4 illustrates an embodiment of a second logic flow.
Figure 5:
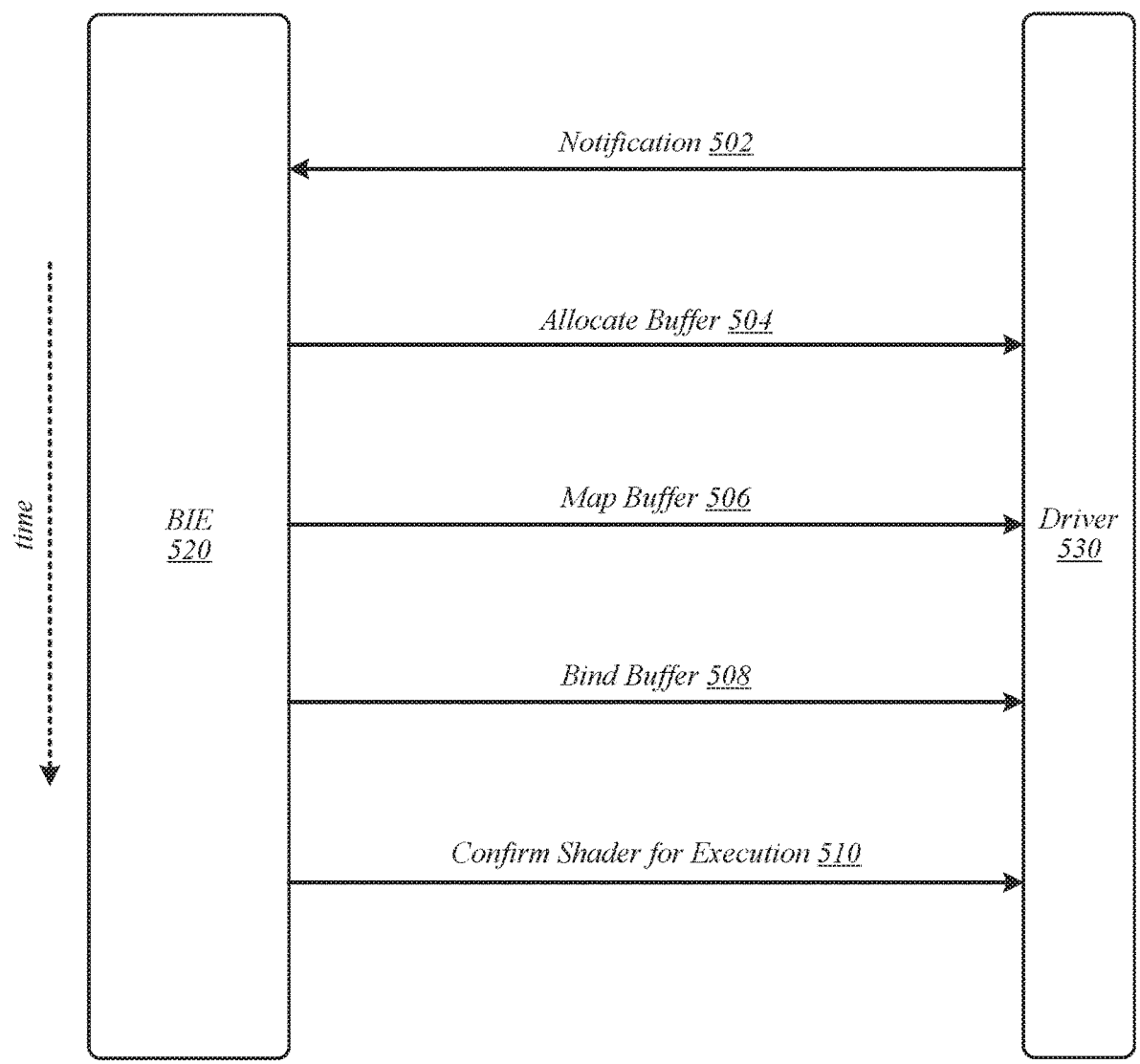
FIG. 5 illustrates an embodiment of a third logic flow.
Figure 6:
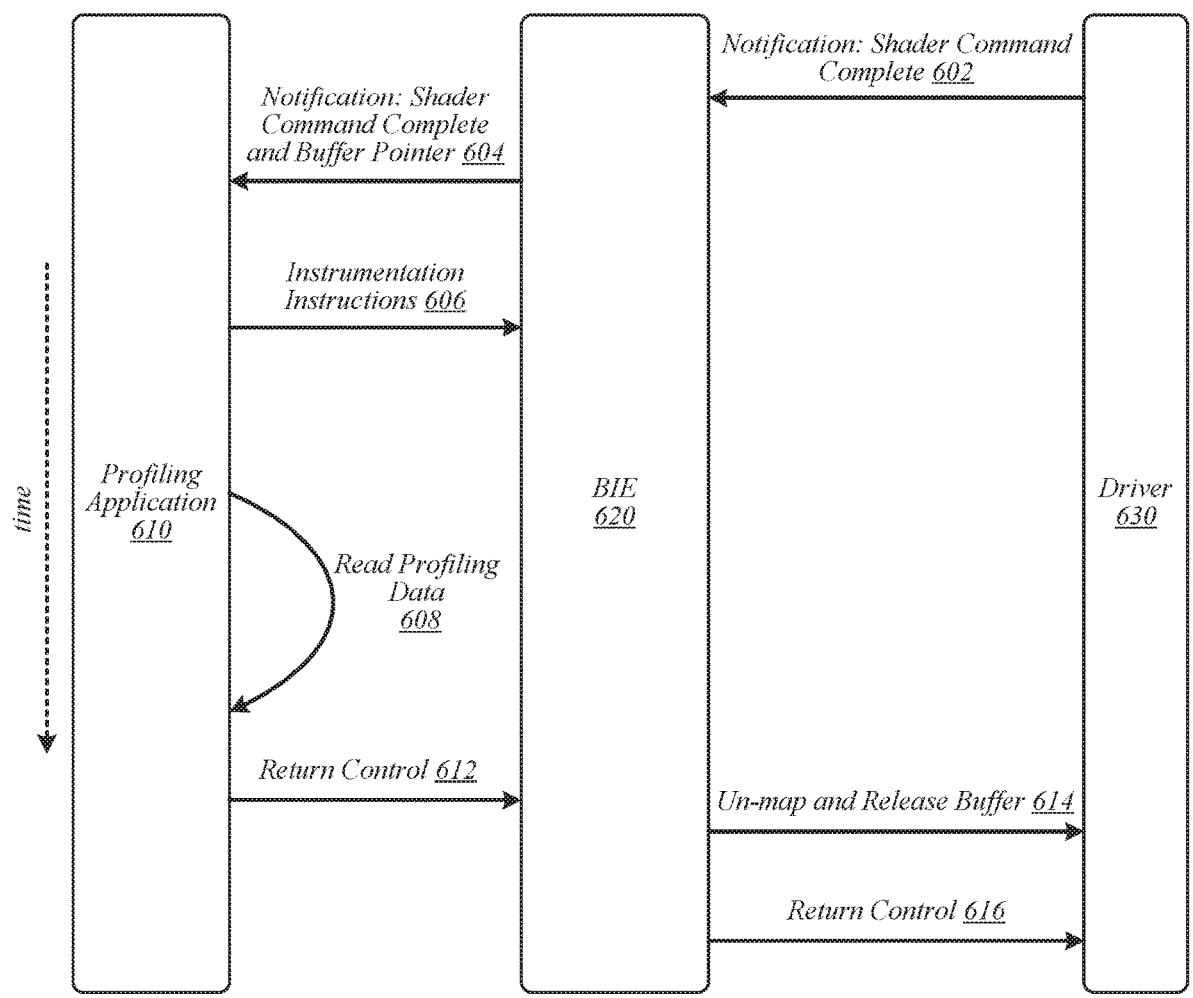
FIG. 6 illustrates an embodiment of a fourth logic flow.

FIGS. 4-6 illustrate flow diagrams for phases of a profiling process according to some embodiments. The phases depicted in FIGS. 4-6 may operate as a phase of a protocol between a profiling application (for example, application 110 and/or application 114) a binary instrumentation engine (BIE) (for example, binary instrumentation module 112), and a driver (for example, driver 120).

In some embodiments, the profiling application may include a layer, implemented in hardware, software, and/or a combination thereof, that may facilitate profiling a GPU application. In various embodiments, the application to be profiled (native application) may not aware of any applied profiling procedures. In various embodiments, the binary instrumentator or BIE may include an entity operative to perform binary instrumentation on operating processes, such as compiled kernels, shaders, and/or the like. In various embodiments, the BIE may operate as a communication entity (for instance, a "go between" or "middle man") between the profiling application and the driver. In exemplary embodiments, the driver may provide information about the execution flow of a profiled application. In some embodiments, the driver may contact the BIE, for instance, via callbacks or other communication messages, signals, and/or the like. Embodiments are not limited in this context.

FIG. 4 depicts a flow for an instrumentation phase according to some embodiments. In some embodiments, the instrumentation phase may include a logic flow 400 operative to control a profiling application 410, a BIE 420 driver, and a profiling application 410. In various embodiments, the instrumentation phase may occur responsive to a profiled application (for example, a GPU application to be profiled according to some embodiments) initiating a profile trigger event, including, without limitation requesting an operating process such as a runtime system to create or build a new kernel or shader. In some embodiments, the runtime system may generate an intermediate, hardware agnostic, representation (for instance, an LLVM, DX bytecode, and/or the like) and invokes the driver 430 to compile it to the underlying hardware architecture. When the final binary shader is ready, the driver 430 may notify the BIE 420 about creation of the new shader. BIE 420 may then notify the profiling application 410. In various embodiments, the profiling application 410 may instruct the BIE 420 how to perform the instrumentation (for instance, including the type and locations within the original binary). The BIE 420 may perform the instrumentation process and return the instrumented binary code is returned to the driver.

More specifically, in reference to FIG. 4, the driver 430 may notify 402 the BIE 420 about a shader creation (i.e., a triggering event). The BIE 420 may notify 404 the profiling application about the shader creation. The profiling application 410 may provide instrumentation instructions 406 to the BIE 420 to instruct the BIE how to instrument the current shader. In various embodiments, the instrumentation may be configured such that data collected on different processes, such as different hardware threads, are saved separately. The BIE may perform the instrumentation process 408 and return the instrumented binary code 412 to the driver 430.

FIG. 5 depicts a flow for an execution phase according to some embodiments. In some embodiments, the execution phase may include logic flow 500 operative to control a BIE 520 and a driver 530. In various embodiments, a profiling application may allocate a buffer to collect profiled data for a current operation or command, such as a draw command, a dispatch command, and/or the like. As depicted in FIG. 5, according to logic flow 500, a driver 530 may communicate a notification 502 to a BIE 520 about an operation process, such as a shader run (for instance, within a specific command, such as a draw command) and sends some meta-data about said shader. In some embodiments, the meta-data may include various information about the operating process, such as a kernel or shader, such as identification information, operating information, and/or the like.

The BIE 520 may communicate to the driver 530 to allocate a buffer 504 to be used for profiling operating process (for instance, a shader) within the current run. In various embodiments, the BIE 520 may invoke the driver 530 to map 506 the allocated buffer to be used by the GPU and CPU. The BIE 520 may communicate a request 508 to the driver 530 to bind the allocated buffer to the specified operating process (for instance, a shader). In exemplary embodiments, the BIE 520 may confirm 510 to the driver 530 the current shader can be send for execution.

FIG. 6 depicts a flow for a completion phase according to some embodiments. In some embodiments, a logic flow 600 may be operative to control a profile application 610, a BIE 620, and/or a driver 630. In various embodiments, in the completion phase, the driver may run the instrumented binary, and the profiling data may be collected and, for example, stored in the allocated buffer. For instance, in the completion phase, the profiling data may be made available and the profiling application may process the profiling data (for example, for post-processing, display, storage, etc.).

As depicted in FIG. 6, according to logic flow 600, the driver 630 may notify 602 the BIE 620 that a specific operating process (for instance, a specific shader) has completed a command, such as a draw and/or dispatch command. The BIE 620 may notify 604 the profiling application 610 that the command is complete and, in some embodiments, may provide a pointer to the buffer containing the profiled data. The profiling application 610 may read 608 the profiling data or results from the buffer and return control 612 of the execution to the BIE 620. In various embodiments, the BIE 620 may un-map and release the buffer 614, for example, via using driver services. The BIE 620 may return control 616 of execution to the driver 630.

Figure 7:
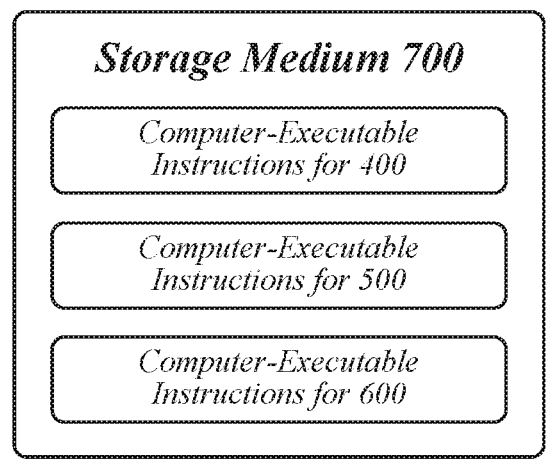
FIG. 7 illustrates an example of a storage medium.

FIG. 7 illustrates an example of a storage medium 700. Storage medium 700 may comprise an article of manufacture. In some examples, storage medium 700 may include any non-transitory computer readable medium or machine readable medium, such as an optical, magnetic or semiconductor storage. Storage medium 700 may store various types of computer executable instructions, such as instructions to implement logic flows 400, 500, and/or 600. Examples of a computer-readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
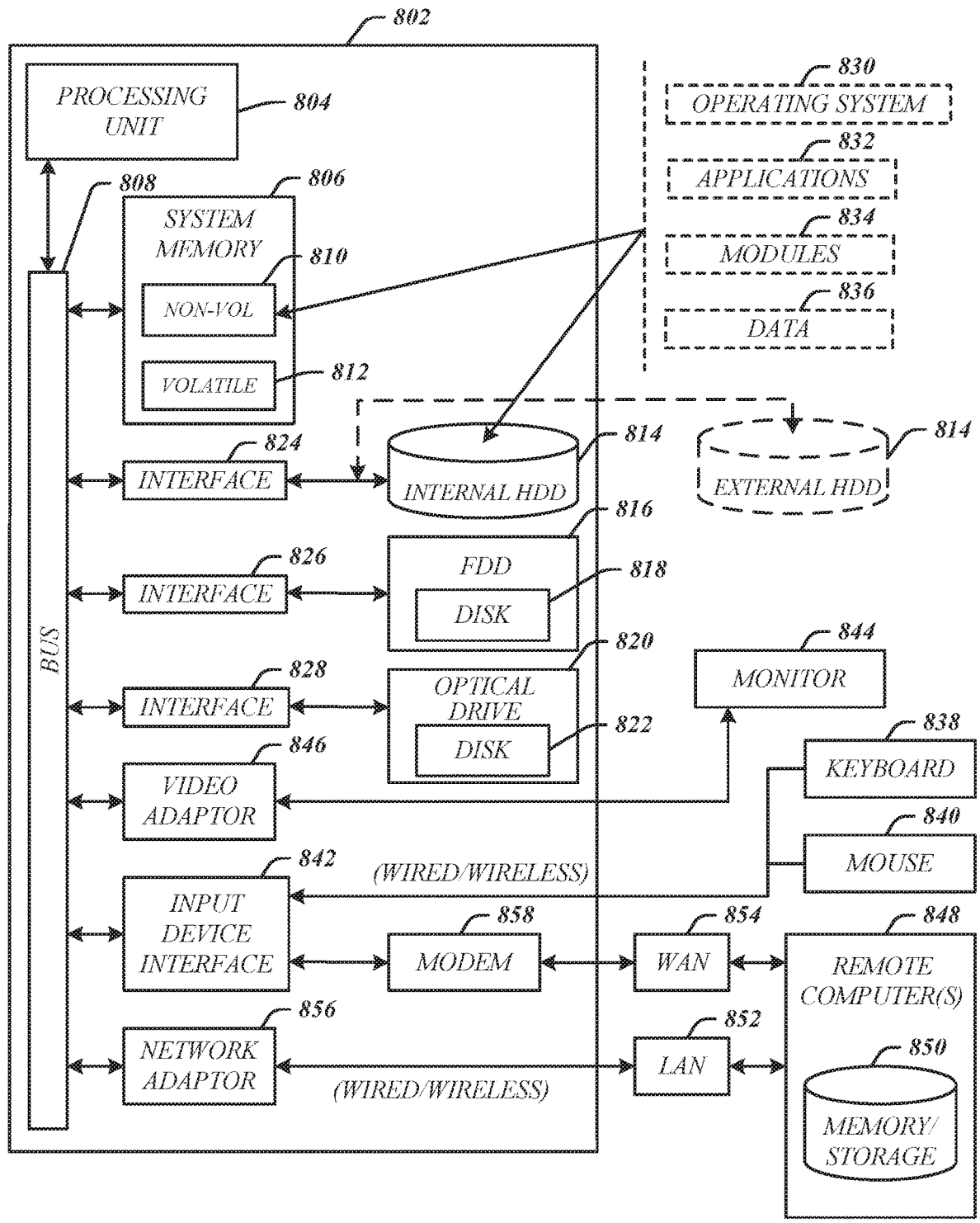
FIG. 8 illustrates an embodiment of a computing architecture.

FIG. 8 illustrates an embodiment of an exemplary computing architecture 800 suitable for implementing various embodiments as previously described. In various embodiments, the computing architecture 800 may comprise or be implemented as part of an electronic device. In some embodiments, the computing architecture 800 may be representative, for example, of operating environment 100, operating environment 200, and/or components thereof. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 may be or may include processing circuitry. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1384 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of operating environment 100, operating environment 200, and/or components thereof.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 1384 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 802 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 808 via the input device interface 842. In a networked environment, program modules depicted relative to the computer 802, or portions thereof, can be stored in the remote memory/storage device 1050. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following include non-limiting example embodiments:

Example 1 is an apparatus, comprising at least one memory comprising instructions, and a processor coupled to the at least one memory, the processor to execute the instructions to implement a profiling process to profile a graphics processing unit (GPU) application being executed via a GPU, the profiling process to perform an instrumentation phase to determine an operating process being executed via the GPU and to generate instrumented binary code for the operating process, perform an execution phase to collect profiling data for a command of the operating process, and perform a completion phase for a profiling application executed via the processor to read the profiling data.

Example 2 is the apparatus of Example 1, the operating process comprising at least one of a compute kernel or a compute shader.

Example 3 is the apparatus of Example 1, the processor to execute the instructions to execute a GPU driver and a binary instrumentation engine (BIE).

Example 4 is the apparatus of Example 3, the processor to execute the instructions to implement the profiling process to perform the instrumentation phase wherein the GPU receives notification of a profile trigger event from the BIE.

Example 5 is the apparatus of Example 4, the profile trigger event comprising creation of the operating process.

Example 6 is the apparatus of Example 3, the processor to execute the instructions to implement the profiling process to perform the instrumentation phase wherein the profiling application operates to instruct the BIE to perform an instrumentation process on the operating process.

Example 7 is the apparatus of Example 6, the processor to execute the instructions to implement the profiling process to perform the instrumentation phase wherein the BIE generates instrumented binary code via the instrumentation process, and provides the instrumented binary code to the GPU driver.

Example 8 is the apparatus of Example 3, the processor to execute the instructions to implement the profiling process to perform the execution phase wherein the BIE causes the GPU driver to allocate a buffer for the profiling data.

Example 9 is the apparatus of Example 8, the processor to execute the instructions to implement the profiling process to perform the execution phase wherein the GPU driver maps the buffer as shared between the GPU and the processor.

Example 10 is the apparatus of Example 8, the processor to execute the instructions to implement the profiling process to perform the execution phase wherein the GPU driver binds the buffer for the operating process for the command.

Example 11 is the apparatus of Example 3, the processor to execute the instructions to implement the profiling process to perform the completion phase wherein the BIE provides the profiling application with a pointer to the buffer responsive to determining that the command has completed.

Example 12 is the apparatus of Example 1, the profiling data comprising data for the operating process at a fine-grain granularity of the GPU.

Example 13 is the apparatus of Example 13, the fine-grain granularity comprising at least one of data at a shader level, data at a kernel level, data at a command level, data at a draw command level, data at a dispatch command level, data for an enqueue command level, data at an execution unit (EU) level, data at a thread level, and data at a hardware thread level.

Example 14 is a system, comprising the apparatus according to any of examples 1-13, and at least one network interface.

Example 15 is a method, comprising executing, via a processor, a profiling process to profile a graphics processing unit (GPU) application being executed via a GPU, the profiling process to perform an instrumentation phase to determine an operating process being executed via the GPU and to generate instrumented binary code for the operating process, perform an execution phase to collect profiling data for a command of the operating process, and perform a completion phase for a profiling application executed via the processor to read the profiling data.

Example 16 is the method of Example 15, the operating process comprising at least one of a compute kernel or a compute shader.

Example 17 is the method of Example 15, executing, via the processor, a GPU driver and a binary instrumentation engine (BIE).

Example 18 is the method of Example 17, the instrumentation phase further comprising the GPU receiving notification of a profile trigger event from the BIE.

Example 19 is the method of Example 18, the profile trigger event comprising creation of the operating process.

Example 20 is the method of Example 17, the instrumentation phase further comprising the profiling application operating to instruct the BIE to perform an instrumentation process on the operating process.

Example 21 is the method of Example 20, the instrumentation phase further comprising the BIE generating instrumented binary code via the instrumentation process, and providing the instrumented binary code to the GPU driver.

Example 22 is the method of Example 17, the execution phase further comprising the BIE causing the GPU driver to allocate a buffer for the profiling data.

Example 23 is the method of Example 22, the execution phase further comprising the GPU driver mapping the buffer as shared between the GPU and the processor.

Example 24 is the method of Example 22, the execution phase further comprising the GPU driver binding the buffer for the operating process for the command.

Example 25 is the method of Example 17, the completion phase further comprising the BIE providing the profiling application with a pointer to the buffer responsive to determining that the command has completed.

Example 26 is the method of Example 15, the profiling data comprising data for the operating process at a fine-grain granularity of the GPU.

Example 27 is the method of Example 15, the fine-grain granularity comprising at least one of data at a shader level, data at a kernel level, data at a command level, data at a draw command level, data at a dispatch command level, data for an enqueue command level, data at an execution unit (EU) level, data at a thread level, and data at a hardware thread level.

Example 28 is a non-transitory computer-readable storage medium that stores computer-executable instructions for execution by processing circuitry of a computing device, the computer-executable instructions, when executed, to cause the computing device to implement a profiling process to profile a graphics processing unit (GPU) application being executed via a GPU, the profiling process to perform an instrumentation phase to determine an operating process being executed via the GPU and to generate instrumented binary code for the operating process, perform an execution phase to collect profiling data for a command of the operating process, and perform a completion phase for a profiling application executed via the processor to read the profiling data.

Example 29 is the non-transitory computer-readable storage medium of Example 28, the operating process comprising at least one of a compute kernel or a compute shader.

Example 30 is the non-transitory computer-readable storage medium of Example 28, the processor to execute the instructions to execute a GPU driver and a binary instrumentation engine (BIE).

Example 31 is the non-transitory computer-readable storage medium of Example 30, the computer-executable instructions, when executed, to cause the computing device to to implement the profiling process to perform the instrumentation phase wherein the GPU receives notification of a profile trigger event from the BIE.

Example 32 is the non-transitory computer-readable storage medium of Example 31, the profile trigger event comprising creation of the operating process.

Example 33 is the non-transitory computer-readable storage medium of Example 30, the computer-executable instructions, when executed, to cause the computing device to implement the profiling process to perform the instrumentation phase wherein the profiling application operates to instruct the BIE to perform an instrumentation phase on the operating process.

Example 34 is the non-transitory computer-readable storage medium of Example 33, the computer-executable instructions, when executed, to cause the computing device to implement the profiling process to perform the instrumentation phase wherein the BIE generates instrumented binary code via the instrumentation phase, and provides the instrumented binary code to the GPU driver.

Example 35 is the non-transitory computer-readable storage medium of Example 30, the computer-executable instructions, when executed, to cause the computing device to implement the profiling process to perform the execution phase wherein the BIE causes the GPU driver to allocate a buffer for the profiling data.

Example 36 is the non-transitory computer-readable storage medium of Example 35, the computer-executable instructions, when executed, to cause the computing device to implement the profiling process to perform the execution phase wherein the GPU driver maps the buffer as shared between the GPU and the processor.

Example 37 is the non-transitory computer-readable storage medium of Example 35, the computer-executable instructions, when executed, to cause the computing device to implement the profiling process to perform the execution phase wherein the GPU driver binds the buffer for the operating process for the command.

Example 38 is the non-transitory computer-readable storage medium of Example 30, the computer-executable instructions, when executed, to cause the computing device to implement the profiling process to perform the completion phase wherein the BIE provides the profiling application with a pointer to the buffer responsive to determining that the command has completed.

Example 39 is the non-transitory computer-readable storage medium of Example 28, the profiling data comprising data for the operating process at a fine-grain granularity of the GPU.

Example 40 is the non-transitory computer-readable storage medium of Example 39, the fine-grain granularity comprising at least one of data at a shader level, data at a kernel level, data at a command level, data at a draw command level, data at a dispatch command level, data for an enqueue command level, data at an execution unit (EU) level, data at a thread level, and data at a hardware thread level.

Example 41 is the non-transitory computer-readable storage medium of Example 28, the computer-executable instructions, when executed, to cause the computing device to execute a GPU driver and a binary instrumentation engine (BIE), and perform the instrumentation phase wherein the BIE generates instrumented binary code via the instrumentation phase, and provides the instrumented binary code to the GPU driver.

Example 42 is the non-transitory computer-readable storage medium of Example 28, the computer-executable instructions, when executed, to cause the computing device to execute a GPU driver and a binary instrumentation engine (BIE), and perform the execution phase wherein the BIE causes the GPU driver to allocate a buffer for the profiling data, the GPU driver to map the buffer as shared between the GPU and processor.

Example 43 is an apparatus, comprising at least one memory means comprising instructions, and a processor means coupled to the at least one memory means, the processor means to execute the instructions to implement a profiling process to profile a graphics processing unit (GPU) application being executed via a GPU means, the profiling process to perform an instrumentation phase to determine an operating process being executed via the GPU means and to generate instrumented binary code for the operating process, perform an execution phase to collect profiling data for a command of the operating process, and perform a completion phase for a profiling application executed via the processor to read the profiling data.

Example 44 is the apparatus of Example 43, the operating process comprising at least one of a compute kernel or a compute shader.

Example 45 is the apparatus of Example 43, the processor means to execute the instructions to execute a GPU driver means and a binary instrumentation engine (BIE) means.

Example 46 is the apparatus of Example 45, the processor means to execute the instructions to implement the profiling process to perform the instrumentation phase wherein the GPU driver means receives notification of a profile trigger event from the BIE means.

Example 47 is the apparatus of Example 46, the profile trigger event comprising creation of the operating process.

Example 48 is the apparatus of Example 45, the processor means to execute the instructions to implement the profiling process to perform the instrumentation phase wherein the profiling application operates to instruct the BIE means to perform an instrumentation process on the operating process.

Example 49 is the apparatus of Example 48, the processor means to execute the instructions to implement the profiling process to perform the instrumentation phase wherein the BIE means generates instrumented binary code via the instrumentation process, and provides the instrumented binary code to the GPU driver means.

Example 50 is the apparatus of Example 45, the processor means to execute the instructions to implement the profiling process to perform the execution phase wherein the BIE means causes the GPU driver means to allocate a buffer for the profiling data.

Example 51 is the apparatus of Example 50, the processor means to execute the instructions to implement the profiling process to perform the execution phase wherein the GPU driver means maps the buffer as shared between the GPU means and the processor means.

Example 52 is the apparatus of Example 50, the processor means to execute the instructions to implement the profiling process to perform the execution phase wherein the GPU driver means binds the buffer for the operating process for the command.

Example 53 is the apparatus of Example 45, the processor means to execute the instructions to implement the profiling process to perform the completion phase wherein the BIE means provides the profiling application with a pointer to the buffer responsive to determining that the command has completed.

Example 54 is the apparatus of Example 43, the profiling data comprising data for the operating process at a fine-grain granularity of the GPU means.

Example 55 is the apparatus of Example 54, the fine-grain granularity comprising at least one of data at a shader level, data at a kernel level, data at a command level, data at a draw command level, data at a dispatch command level, data for an enqueue command level, data at an execution unit (EU) level, data at a thread level, and data at a hardware thread level.

Example 56 is a system, comprising the apparatus according to any of examples 43-55, and at least one network interface.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   at least one memory comprising instructions; and
   a processor coupled to the at least one memory, the processor to execute the instructions to implement a profiling process to profile a graphics processing unit (GPU) application being executed via a GPU, the profiling process to cause:
   a binary instrumentation engine (BIE) to communicate with a GPU driver to perform an instrumentation phase to determine an operating process being executed via the GPU and to generate instrumented binary code from an original binary for the operating process, the instrumented binary code to comprise profiling instructions inserted at different code locations in the original binary code as specified by an instrumentation schema to measure machine instruction-level performance of the operating process,
   the BIE to provide the instrumented binary code to the GPU driver to perform an execution phase to collect profiling data for a command of the operating process, and
   the GPU driver to notify the BIE when the operating process is complete to perform a completion phase for a profiling application executed via the processor to read the profiling data.

2. The apparatus of claim 1, the operating process comprising at least one of a compute kernel or a compute shader.

3. The apparatus of claim 1, the processor to execute the instructions to implement the profiling process to perform the instrumentation phase wherein the GPU driver receives notification of a profile trigger event from the BIE.

4. The apparatus of claim 3, the profile trigger event comprising creation of the operating process.

5. The apparatus of claim 1, the processor to execute the instructions to implement the profiling process to perform the instrumentation phase wherein the profiling application operates to instruct the BIE to perform an instrumentation process on the operating process.

6. The apparatus of claim 5, the processor to execute the instructions to implement the profiling process to perform the instrumentation phase wherein the BIE:
   generates instrumented binary code via the instrumentation process.

7. The apparatus of claim 1, the processor to execute the instructions to implement the profiling process to perform the execution phase wherein the BIE causes the GPU driver to allocate a buffer for the profiling data.

8. The apparatus of claim 7, the processor to execute the instructions to implement the profiling process to perform the execution phase wherein the GPU driver maps the buffer as shared between the GPU and the processor.

9. The apparatus of claim 7, the processor to execute the instructions to implement the profiling process to perform the execution phase wherein the GPU driver binds the buffer for the operating process for the command.

10. The apparatus of claim 7, the processor to execute the instructions to implement the profiling process to perform the completion phase wherein the BIE provides the profiling application with a pointer to the buffer responsive to determining that the command has completed.

11. A method, comprising:
    performing an instrumentation phase via a binary instrumentation engine (BIE) and a graphics processing unit (GPU) driver to determine an operating process being executed via the GPU and to generate instrumented binary code from an original binary for the operating process, the instrumented binary code to comprise profiling instructions inserted at different code locations in the original binary code as specified by an instrumentation schema to measure machine instruction-level performance of the operating process,
    performing an execution phase to collect profiling data for a command of the operating process when the BIE provides the instrumented binary code to the GPU driver, and
    performing a completion phase for a profiling application to read the profiling data when the GPU driver notifies the BIE that the operating process is complete.

12. The method of claim 11, the operating process comprising at least one of a compute kernel or a compute shader.

13. The method of claim 11, executing, via a processor, the GPU driver and the BIE.

14. The method of claim 13, the instrumentation phase further comprising the GPU driver receiving notification of a profile trigger event from the BIE.

15. The method of claim 14, the profile trigger event comprising creation of the operating process.

16. The method of claim 13, the instrumentation phase further comprising the profiling application operating to instruct the BIE to perform an instrumentation process on the operating process.

17. The method of claim 16, the instrumentation phase further comprising the BIE:
    generating instrumented binary code via the instrumentation process.

18. The method of claim 13, the execution phase further comprising the BIE causing the GPU driver to allocate a buffer for the profiling data.

19. The method of claim 18, the execution phase further comprising the GPU driver mapping the buffer as shared between the GPU and the processor.

20. The method of claim 18, the execution phase further comprising the GPU driver binding the buffer for the operating process for the command.

21. The method of claim 18, the completion phase further comprising the BIE providing the profiling application with a pointer to the buffer responsive to determining that the command has completed.

22. A non-transitory computer-readable storage medium that stores computer-executable instructions for execution by processing circuitry of a computing device, the computer-executable instructions, when executed, to cause the computing device to:
    perform an instrumentation phase via a binary instrumentation engine (BIE) and a graphics processing unit (GPU) driver to determine an operating process being executed via the GPU and to generate instrumented binary code from an original binary for the operating process, the instrumented binary code to comprise profiling instructions inserted at different code locations in the original binary code as specified by an instrumentation schema to measure machine instruction-level performance of the operating process, perform an execution phase to collect profiling data for a command of the operating process when the BIE provides the instrumented binary code to the GPU driver, and perform a completion phase for a profiling application to read the profiling data when the GPU driver notifies the BIE that the operating process is complete.

23. The non-transitory computer-readable storage medium of claim 22, the computer-executable instructions, when executed, to cause the computing device to:
execute the GPU driver and the BIE by a processor, and
perform the execution phase wherein the BIE causes the GPU driver to allocate a buffer for the profiling data, the GPU driver to map the buffer as shared between the GPU and processor.

* * * * *